(12) United States Patent
Lakrout et al.

(10) Patent No.: US 11,919,285 B2
(45) Date of Patent: Mar. 5, 2024

(54) INSULATION PANELS AND METHODS OF PREPARATION THEREOF

(71) Applicant: Westlake Royal Building Products Inc., Houston, TX (US)

(72) Inventors: Hamed Lakrout, San Antonio, TX (US); Cassandra Hill, Norristown, PA (US)

(73) Assignee: Westlake Royal Building Products Inc., Houston, TX (US)

( * ) Notice: Subject to any disclaimer, the term of this patent is extended or adjusted under 35 U.S.C. 154(b) by 0 days.

(21) Appl. No.: 17/827,469

(22) Filed: May 27, 2022

(65) Prior Publication Data
US 2022/0388272 A1 Dec. 8, 2022

Related U.S. Application Data

(60) Provisional application No. 63/194,610, filed on May 28, 2021.

(51) Int. Cl.
| | |
|---|---|
| *B32B 5/18* | (2006.01) |
| *B32B 7/02* | (2019.01) |
| *B32B 27/06* | (2006.01) |
| *B32B 27/40* | (2006.01) |

(52) U.S. Cl.
CPC .......... *B32B 5/18* (2013.01); *B32B 7/02* (2013.01); *B32B 27/065* (2013.01); *B32B 27/40* (2013.01); *B32B 2266/0278* (2013.01); *B32B 2266/08* (2013.01); *B32B 2307/304* (2013.01)

(58) Field of Classification Search
CPC ........... B32B 5/18; B32B 7/02; B32B 27/065; B32B 27/40; B32B 2266/0278; B32B 2266/08; B32B 2307/304
See application file for complete search history.

(56) References Cited

U.S. PATENT DOCUMENTS

2014/0138014 A1 * 5/2014 Chaudhry ................. B32B 5/18
  156/77
2018/0100306 A1 * 4/2018 Steppan .................. E04C 2/205

FOREIGN PATENT DOCUMENTS

WO    WO-2017204778 A1 * 11/2017 ............. C08G 18/32

OTHER PUBLICATIONS

"Au Hebel PowerPanel Xl External Wall d=186 mm R=2,84 m2K/W," last accessed Oct. 2, 2023, 4 pages, available at https://www.bimobjectcom/en/hebel/product/com_au_h_pp_xl_wall_external_d_186_r_2-84.

* cited by examiner

*Primary Examiner* — David Sample
*Assistant Examiner* — Donald M Flores, Jr.
(74) *Attorney, Agent, or Firm* — Bookoff McAndrews PLLC

(57) ABSTRACT

Insulation panels and methods of use and manufacturing are described herein. The insulation panel may comprise a polymer composite comprising a first polymer and a first filler, wherein the first filler is present in an amount of 40% to 80% by weight, based on the total weight of polymer composite, wherein the polymer composite has a closed cell structure, and wherein the polymer composite has a density of 2 pcf to 30 pcf; and a facer covering at least a portion of the polymer composite, the facer comprising a second polymer and a second filler; wherein the insulation panel has an insulation R-value per inch of at least 2.5.

19 Claims, No Drawings

INSULATION PANELS AND METHODS OF PREPARATION THEREOF

CROSS-REFERENCE TO RELATED APPLICATION(S)

This application claims priority to U.S. Provisional Application No. 63/194,610 filed on May 28, 2021, which is incorporated by reference herein in its entirety.

TECHNICAL FIELD

The present disclosure generally relates to composite materials useful for insulation, e.g., insulation panels, and methods of use and preparation thereof.

BACKGROUND

With global floor area growth ever increasing and the high energy cost of maintaining a comfortable living space, proper insulation of buildings is of growing concern. Applying insulation to exterior walls is possible, but providing the required insulation along with other properties, such as thermal protection, requires more specialized insulating products.

SUMMARY

The present disclosure includes an insulation panel comprising a polymer composite comprising a first polymer and a first filler, wherein the first filler is present in an amount of 40% to 80% by weight, based on the total weight of polymer composite, wherein the polymer composite has a closed cell structure, and wherein the polymer composite has a density of 2 pcf to 30 pcf; and a facer covering at least a portion of the polymer composite, the facer comprising a second polymer and a second filler; wherein the insulation panel has an insulation R-value per inch of at least 2.5.

In some embodiments, the polymer composite may have a closed cell content greater than or equal to 60% as measured by ASTM D6226-15, an insulation R-value per inch of at least 4, or both. The second filler may be present in an amount of greater than or equal to 50% by weight, with respect to the total weight of the facer; the facer may have a density greater than the density of the polymer composite; the density of the facer may range from 50 pcf to 200 pcf; the insulation panel may have a thickness less than or equal to 3 inches; the facer may have a thickness less than or equal to 1 inch; and/or a compressive strength of the insulation panel is 100 psi to 350 psi. In some examples, the first filler, the second filler, or both, may comprise fly ash, limestone, clay, gypsum, glass powder, bottom ash, glass microspheres, cenospheres, calcium carbonate, or a combination thereof. In other examples, the first polymer, the second polymer, or both may comprise polyurethane. An outer surface of the insulation panel may include attachment features complementary to an adjacent insulation panel, the attachment features comprising a tongue, a groove, a fastener, a bracket, or a rail.

The present disclosure also includes an insulation panel comprising a polymer composite comprising a polymer and a filler, the polymer composite having a closed cell content greater than or equal to 50% as measured by ASTM D6226-15 and a density of 5 pcf to 15 pcf; and a facer covering at least a portion of the polymer composite, the facer having a density greater than the density of the polymer composite; wherein the insulation panel has an insulation R-value per inch of at least 2.5; and wherein an outer surface of the insulation panel includes attachment features complementary to attachment features of an adjacent insulation panel. In some examples, the attachment features may include a tongue, a groove, a fastener, a bracket, or a rail. The polymer may be a first polymer and the filler may be a first filler, wherein the facer comprises a second polymer and a second filler, the first polymer being the same or different than the second polymer, and the first filler being the same or different than the second filler. The first filler, the second filler, or both, may comprise fly ash, limestone, clay, gypsum, glass powder, bottom ash, glass microspheres, cenospheres, calcium carbonate, or a combination thereof. In some examples, the insulation panel may have a thickness of 1 inch to 3 inches.

The present disclosure also includes an insulation panel comprising a polymer composite comprising a first polymer and a first filler, wherein the first filler is present in an amount of 40% to 80% by weight, based on the total weight of polymer composite; and wherein the polymer composite has a closed cell structure; and a facer covering at least a portion of the polymer composite, the facer having a density greater than a density of the polymer composite; wherein the insulation panel has a thickness less than or equal to 3 inches; and wherein the insulation panel has an insulation R-value per inch of at least 4. In some examples, the polymer composite may have a closed cell content of 50% to 80% as measured by ASTM D6226-15. In some embodiments, an outer surface of the insulation panel may include a tongue, a groove, a fastener, a bracket, or a rail.

DETAILED DESCRIPTION

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., a molecular weight between 250 g/mol and 1000 g/mol includes 250 g/mol, 1000 g/mol, and all values between.

The present disclosure includes composite materials useful for insulation, such as insulation panels. For example, an exemplary insulation panel according to the present disclosure comprises a polymer composite and a facer, wherein the facer may include a design element that provides the appearance of a desired material or texture.

Typical application of insulation, e.g., soft batts or blown-in materials, on the interior surfaces of wall structures may lead to condensation forming between the wall and insulation due to an increased temperature difference between the exterior and interior walls. This moisture may eventually lead to decreased effectiveness of the insulation and increased costs due to repairs and high energy usage. Seams and joints present in interior insulation also produce air leakage and thermal bridging, which is the movement of heat across an object that is more conductive than the materials around it. The materials herein may help to decrease condensation and increase energy efficiency, e.g., by increasing insulation performance, reducing thermal bridging, and/or minimizing air leakage. The combination of the insulation and a facer, e.g., a design element providing an exterior façade, may provide benefits, such as improved sealing, quicker installation times, and/or lower costs.

The insulation panels herein may have an insulation R-value suitable for materials incorporated into an exterior wall, such as, e.g., an R-value per inch of at least 10. The desired thermal insulation properties may be provided at least partially by a closed cell structure of the polymer composite. The facer together with the polymer composite may provide desired physiochemical properties while being relatively lightweight as compared to other insulation materials, with the appearances desired for an exterior façade. According to some aspects of the present disclosure, the insulation panel may include attachment features, e.g., a tongue, a groove, a fastener, a bracket, and/or a rail, to assist with installation of the insulation panel.

The insulation panels herein may comprise a polymer composite, e.g., a filled polymer composite foam. The polymer of the composite may comprise a thermosetting polymer. For example, the polymer may comprise an epoxy resin, phenolic resin, bismaleimide, polyimide, polyolefin, polyurethane, polyvinylchloride, polypropylene, polyethylene, polyethylene terephthalate, polyamide, polystyrene, acrylonitrile butadiene styrene, polycarbonate, polyethylenimine, or a combination thereof. In some examples, the polymer comprises polyurethane, e.g., prepared by combining a polyol with an isocyanate, with other components such as fillers or additives.

In some examples herein, the polymer composite may comprise polyurethane, e.g., prepared by an isocyanate and at least one polyol. Isocyanates suitable for use in preparing the insulation panels herein may include at least one monomeric or oligomeric poly- or di-isocyanate. Exemplary diisocyanates include, but are not limited to, methylene diphenyl diisocyanate (MDI), including MDI monomers, oligomers, and combinations thereof. Factors that may influence the choice of a particular isocyanate can include the overall properties of the polymer composite, such as the amount of foaming, strength of bonding to a filler, wetting of inorganic fillers in the mixture, strength of the resulting insulation panel, stiffness (elastic modulus), and reactivity.

The polyol(s) may be in liquid form. For example, liquid polyols having relatively low viscosities generally facilitate mixing. Suitable polyols include those having viscosities of 10000 cP or less at 25° C., such as a viscosity of 150 cP to 10000 cP, 200 cP to 8000 cP, 5000 cP to 10,000 cP, 5000 cP to 8000 cP, 2000 to 6000 cP, 250 cP to 500 cP, 500 cP to 4000 cP, 750 cP to 3500 cP, 1000 cP to 3000 cP, or 1500 cP to 2500 cP at 25° C. Further, for example, the polyol(s) may have a viscosity of 8000 cP or less, 6000 cP or less, 5000 cP or less, 4000 cP or less, 3000 cP or less, 2000 cP or less, 1000 cP or less, or 500 cP or less at 25° C.

The polyols useful for the insulation panels herein may include compounds of different reactivity, e.g., having different numbers of primary and/or secondary hydroxyl groups. In some embodiments, the polyols may be capped with an alkylene oxide group, such as ethylene oxide, propylene oxide, butylene oxide, and combinations thereof, to provide the polyols with the desired reactivity. In some examples, the polyols can include a poly(propylene oxide) polyol including terminal secondary hydroxyl groups, the compounds being end-capped with ethylene oxide to provide primary hydroxyl groups.

The polyol(s) useful for the present disclosure may have a desired functionality. For example, the functionality of the polyol(s) may be 7.0 or less, e.g., 1.0 to 7.0, or 2.5 to 5.5. In some examples, the functionality of the polyol(s) may be 6.5 or less, 6.0 or less, 5.5 or less, 5.0 or less, 4.5 or less, 4.0 or less, 3.5 or less, 3.0 or less, 2.5 or less, and/or 1.0 or greater, 2.0 or greater, 2.5 or greater, 3.0 or greater, 3.5 or greater, or 4.0 or greater, 4.5 or greater, or 5.0 or greater. The average functionality of the polyols useful for the panels herein may be 1.5 to 5.5, 2.5 to 5.5, 3.0 to 5.5, 3.0 to 5.0, 2.0 to 3.0, 3.0 to 4.5, 2.5 to 4.0, 2.5 to 3.5, or 3.0 to 4.0.

The polyol(s) useful for the insulation panels herein may have an average molecular weight of 250 g/mol or greater and/or 1500 g/mol or less. For example, the polyol(s) may have an average molecular weight of 300 g/mol or greater, 400 g/mol or greater, 500 g/mol or greater, 600 g/mol or greater, 700 g/mol or greater, 800 g/mol or greater, 900 g/mol or greater, 1000 g/mol or greater, 1100 g/mol or greater, 1200 g/mol or greater, 1300 g/mol or greater, or 1400 g/mol or greater, and/or 1500 g/mol or less, 1400 g/mol or less, 1300 g/mol or less, 1200 g/mol or less, 1100 g/mol or less, 1000 g/mol or less, 900 g/mol or less, 800 g/mol or less, 700 g/mol or less, 600 g/mol or less, 500 g/mol or less, 400 g/mol or less, or 300 g/mol or less. In some cases, the one or more polyols have an average molecular weight of 250 g/mol to 1000 g/mol, 500 g/mol to 1000 g/mol, or 750 g/mol to 1250 g/mol.

Polyols useful for the insulation panels herein include, but are not limited to, aromatic polyols, polyester polyols, poly ether polyols, Mannich polyols, and combinations thereof. Exemplary aromatic polyols include, for example, aromatic polyester polyols, aromatic polyether polyols, and combinations thereof. Exemplary polyester and poly ether polyols useful in the present disclosure include, but are not limited to, glycerin-based polyols and derivatives thereof, polypropylene-based polyols and derivatives thereof, and poly ether polyols such as ethylene oxide, propylene oxide, butylene oxide, and combinations thereof that are initiated by a sucrose and/or amine group. Mannich polyols are the condensation product of a substituted or unsubstituted phenol, an alkanolamine, and formaldehyde. Examples of Mannich polyols that may be used include, but are not limited to, ethylene and propylene oxide-capped Mannich polyols.

The polymer composite optionally may comprise one or more additional isocyanate-reactive monomers. When present, the additional isocyanate-reactive monomer(s) can be present in an amount of 30% or less, 25% or less, 20% or less, 15% or less, 10% or less, or 5% or less by weight, based on the weight of the one or more polyols. Exemplary isocyanate-reactive monomers include, for example, polyamines corresponding to the polyols described herein (e.g., a polyester polyol or a poly ether polyol), wherein the terminal hydroxyl groups are converted to amino groups, for example by amination or by reacting the hydroxyl groups with a diisocyanate and subsequently hydrolyzing the terminal isocyanate group to an amino group. Exemplary isocyanate-reactive monomers include, but are not limited to poly ether polyamines, such as polyoxyalkylene diamine or polyoxyalkylene triamine. The insulation panels herein may comprise an alkoxylated polyamine (e.g., alkylene oxide-capped polyamines) derived from a polyamine and an alkylene oxide. Alkoxylated polyamines may be formed by reacting a suitable polyamine (e.g., monomeric, oligomeric, or polymeric polyamines) with a desired amount of an alkylene oxide.

In the insulation panels herein, the amount of polymer may be present in the polymer composite in an amount of 10% to 65% by weight, such as 25% to 55%, 15% to 50%, or 35% to 55% by weight, based on the total weight of the composite.

As mentioned above, the insulation panels herein may comprise a filler, such as an inorganic filler material. Examples of fillers useful for the insulation panels herein include, but are not limited to, fly ash, bottom ash, limestone, amorphous carbon (e.g., carbon black), silica (e.g., silica sand, silica fume, quartz), glass (e.g., ground/recycled glass such as window or bottle glass, milled glass, glass spheres and microspheres, glass flakes, glass powder), calcium, calcium carbonate, calcium oxide, calcium hydroxide, aluminum, aluminum trihydrate, clay (e.g., kaolin, red mud clay, bentonite), mica, talc, wollastonite, alumina, feldspar, gypsum (calcium sulfate dehydrate), garnet, saponite, beidellite, granite, slag, antimony trioxide, barium sulfate, magnesium, magnesium oxide, magnesium hydroxide, aluminum hydroxide, gibbsite, titanium dioxide, zinc carbonate, zinc oxide, molecular sieves, perlite (including expanded perlite), diatomite, vermiculite, pyrophillite, expanded shale, volcanic tuff, pumice, hollow ceramic spheres, hollow plastic spheres, expanded plastic beads, ground tire rubber, cenospheres, or mixtures thereof. In some examples, the insulation panels comprise one or more fiber materials. Other exemplary fillers include fiber materials, e.g., natural and synthetic fibers based on inorganic or organic materials. Exemplary fiber materials include, but are not limited to, glass fibers (fiberglass), silica fibers, carbon fibers, metal fibers, mineral fibers, organic polymer fibers, cellulose fibers, biomass fibers, and combinations thereof.

In some embodiments, the filler may comprise an ash produced by firing fuels including coal, industrial gases, petroleum coke, petroleum products, municipal solid waste, paper sludge, wood, sawdust, refuse derived fuels, switchgrass, or other biomass material. For example, the filler may comprise a coal ash, such as fly ash, bottom ash, or combinations thereof. Fly ash is generally produced from the combustion of pulverized coal in electrical power generating plants. In some examples herein, the insulation panel comprises fly ash selected from Class C fly ash, Class F fly ash, or a mixture thereof. In some embodiments, the filler consists of or consists essentially of fly ash.

The polymer composite may comprise filler(s) in an amount less than or equal to 80% by weight, with respect to the total weight of the polymer composite. For example, the amount of filler in the polymer composite may be 40% to 80% by weight, e.g., 40% to 70% by weight, 40% to 60% by weight, or 45% to 65% by weight.

The polymer composite may comprise at least one additional material, such as, e.g., foaming agents, surfactants (Tegostab B 8407, Tegostab B 8523), chain-extenders, crosslinkers, coupling agents, UV stabilizers, fire retardants, antimicrobials, anti-oxidants, and/or pigments. The polymer composite may be prepared as a foam using chemical blowing agents, physical blowing agents, or a combination thereof. If a blowing agent is present in the polymer composite, the amount of blowing agent may be present in an amount of less than 1 part per hundred, relative to the total weight of the polymeric material. Exemplary blowing agents include, e.g., chemical blowing agents such as water or physical blowing agents such as carbon dioxide or pentane.

The insulation panels herein may comprise a facer providing a smooth, rigid, and/or durable surface. For example, the insulation panel may comprise a facer covering at least a portion of the polymer composite. The facer may also provide a design element resembling desired materials such as brick, stone, wood, tile, or the like. The facer may provide rigidity to the polymer composite and the durability, aesthetics, and/or feel of desired building materials without the corresponding weight of those materials.

The facer of the insulation panels herein may comprise any suitable material useful for simulating various building materials. Exemplary materials suitable for the facer include but are not limited to, cementitious materials, polymeric cement, fiber mesh, fillers, composite materials including polymers, mixtures thereof, and combinations thereof.

When the facer comprises a composite material that includes a polymer, the facer may comprise the same or different polymer and/or filler as the polymer composite of the insulation panel. For example, the polymer composite may comprise a first polymer and the facer may comprise a second polymer, wherein the first polymer is the same or different than the second polymer. Further, for example, the first polymer, the second polymer, both the first polymer and the second polymer, may comprise polyurethane. Further, for example, the polymer composite may comprise a first filler and the facer may comprise a second filler, wherein the first filler is the same or different than the second filler. In at least one example, the first filler, the second filler, independently may comprise fly ash, limestone, clay, gypsum, glass powder, bottom ash, glass microspheres, cenospheres, calcium carbonate, or a combination thereof.

The insulation panels described herein may be prepared by any suitable process, including, for example, a molding process. For example, a mold may be used to produce an insulation panel with the desired dimensions. In an exemplary method, the facer first may be applied to the mold surface. Then, a polymer mixture prepared by combining one or more polyols with an isocyanate and filler(s), together with any other components such as a blowing agent, may be added to the mold, such that the polymer mixture directly contacts the facer. For example, the polymer mixture may form a polymer composite by free rise foaming with the assistance of one or more blowing agents. The blowing agent(s) may be used to trap gas within the matrix during the foaming process and establish a structure of cells. In other examples, the facer may be prepared separately from the polymer mixture. The polymer mixture may form a polymer composite and the facer may be applied (e.g., fixedly attached) to the polymer composite, e.g., via an adhesive. Other components such as surfactants may be used to produce the desired cell structure. The resulting insulation panel can then be cut into a desired shape and/or size, such as sheets or large blocks. A person of ordinary skill in the art will recognize that the insulation panel need not be prepared in sheet-like form and other dimensions and shapes are encompassed herein.

As mentioned above, the polymer composite may have a closed cell structure. A higher percentage of closed cells is expected to provide a material with greater thermal insulation. The cell content can be measured by ASTM D6226-15. Cell structure can also be assessed using a pycnometer, which calculates the volume and density of a sample by feeding helium into a closed chamber with the sample inside. With the known values of sample mass, volume of the empty chamber, and mass and density of the helium, the pycnometer calculates the volume and density of the sample inside. For a porous material, closed cells of the material block helium from entering the sample and result in a larger measured volume and lower corresponding density, as compared to a sample having a higher open cell percentage.

According to some aspects of the present disclosure, the polymer composite may have a closed cell content of greater than or equal to 50%, such as greater than or equal to 60%, e.g., between 50% and 80%, between 50% and 70% or between 60% and 80%. Additionally or alternatively, the thickness of the closed cell walls may be about 10 microns, as opposed to a thickness of 50 microns to 100 microns for open cell walls.

In some embodiments, the foam composite has a fine cell structure, e.g., a large number of cells with a relatively small cell size. In other embodiments, the foam composite has a coarse cell structure, e.g., a smaller number of cells with a relatively large cell size. The term "fine cell structure" as used herein includes, for example, foam cell structures that have a distribution of pore diameters centered between 100 µm and 500 µm. The fine cell structure may provide desired insulation properties.

The facer may be prepared separately, e.g., by combining one or more polyols with an isocyanate and filler(s). The facer may be prepared in a manner so as to prevent, inhibit, or reduce foaming, e.g., to provide for a denser material. For example, the facer may be prepared without blowing agents and/or surfactants. The facer may prepared in a single batch (e.g., combining the polyol, isocyanate, and filler in a single mixture). Alternatively, the facer may be prepared from a first component that includes the polyol and a portion of the filler, and a second component that includes the isocyanate and a second portion of the filler. Each of the first and second components may have a paste-like or semi-solid consistency or viscosity. The first and second components then may be combined, e.g., by extrusion or other process suitable for mixing the viscous components. Once the polyol component and isocyanate components are in contact, they may react to form the polymer (polyurethane) composite. The resulting mixture may be shaped into a sheet or other suitable shape before the reaction is complete. In some examples, the facer may be prepared by combining about 5-10% by weight polyol(s), 5-10% by weight isocyanate, and 80-90% by weight filler, with respect to the total weight of the facer.

The facer (prepared in a batch or two-component process as described above) may cover one or more surfaces of the polymer composite, e.g., covering a front surface, a back surface opposite the front surface, and/or one or more side surfaces. For example, the facer may cover at least one surface or only one surface of the polymer composite (e.g., the front surface).

As mentioned above, the facer may include at least one design element configured to resemble various building materials, for example, stone, brick, wood, or the like. In some examples, one or more surfaces of the polymer composite may comprise, consist of, or consist essentially of the facer, which provides the design element(s). The facer may include one or more layers of plaster, coating, and/or paint, to provide the design element(s). Optionally, the opposite surface and/or one or more adjacent surfaces also may include a facer. In some examples herein, only one surface includes a facer (e.g., only the front surface and not the back surface). That is, the back surface of the insulation panel is defined by the polymer composite without a facer or coating. In other examples, both the front surface and the back surface include a facer. Including a facer on both sides may help to avoid damage to the insulation panel during handling and installation and the risk of having the insulation panel with the wrong surface facing outward.

The insulation panels herein may combine relatively low density with desired insulation properties, such that the insulation panel may be suitable for use as building products, including as exterior structures. A lower density insulation panel, compared to conventional exterior building products may be more workable and easier install. For example, the density of the polymer composite may be in a range of 2 pcf to 30 pcf, e.g., 2 pcf to 20 pcf, 5 pcf to 20 pcf, or 5 pcf to 15 pcf. In some examples, the density of the facer is higher than that of the polymer composite. For example, the density of the facer may be greater than or equal to 50 pcf, e.g., in a range of 50 pcf to 200 pcf, 75 pcf to 200 pcf, 100 pcf to 200 pcf, 125 pcf to 200 pcf, 150 pcf to 200 pcf, 50 pcf to 100 pcf, 50 pcf to 125 pcf, 50 pcf to 150 pcf, or 50 pcf to 175 pcf.

The insulation panels herein may have a compressive strength of 100 psi to 350 psi. For example, the insulation panels according to the present disclosure may have a compressive strength of 100 psi to 250 psi, 200 psi to 275 psi, 250 psi to 300 psi, 285 psi to 325 psi, or 290 psi to 325 psi. Compressive strength can be measured by the stress measured at the point of permanent yield, zero slope, or significant change of the stress variation with strain on the stress-strain curve as measured according to ASTM D1621.

Additionally or alternatively, the insulation panels may have a flexural strength of 100 psi to 1000 psi, such as 200 psi to 500 psi, 150 psi to 350 psi, 400 psi to 800 psi, 550 psi to 750 psi, 650 psi to 950 psi. Flexural strength can be measured as the load required to fracture a rectangular prism loaded in the three point bend test as described in ASTM C947, wherein flexural modulus is the slope of the stress/strain curve at low strain.

Further, the insulation panels herein may have a thermal conductivity ranging from 0.020 W/m·K to 0.100 W/m·K, such as 0.020 W/m·K to 0.060 W/m·K 0.050 W/m·K to 0.070 W/m·K, or 0.060 W/m·K to 0.950 W/m·K. Thermal conductivity can be measured according to ASTM D5930-17. The insulation panels herein may have an thermal resistance, i.e., insulation R-value, per inch of at least 2.5, at least 4, e.g., ranging from 2 to 8. The insulation R-value can be measured according to ASTM C168. Thermal requirements may depend on various factors and considerations including, e.g., environmental and regional factors. In general, thicker materials may have higher insulation R-values.

According to some aspects of the present disclosure, the panels may be prepared as a flat sheet (in rectangular shape having a length, a width, and a thickness) having an outer surface. The insulation panel may be configured to attach to an adjacent insulation panel to form long siding panels. For example, an outer surface of the insulation panel may have attachment features complementary to attachment features of an outer surface of the adjacent insulation panel such that the outer surface of the first insulation panel may attach to the outer surface of the adjacent insulation panel. The attachment features may comprise a tongue, a groove, a fastener, a bracket, a rail, or a combination thereof.

The insulation panel may have a length greater than about 1 foot, greater than about 2 feet, greater than about 3 feet, greater than about 4 feet, greater than about 5 feet, greater than about 6 feet, greater than about 7 feet, greater than about 8 feet, or greater than 9 feet. For example, the length of the panel may range from about 2 feet to about 20 feet, from about 4 feet to about 18 feet, or from about 6 feet to about 16 feet.

The insulation panel may have a width ranging from 1 inch to 8 feet, for example, from 1 inch to 12 inches, 2 inches to 10 inches, 4 inches to 8 inches, 1 inch to 7 feet, 1 foot to 7 feet, 1 foot to 6 feet, 1 foot to 5 feet, 1 foot to 4 feet, or 1 foot to 3 feet.

Further, for example, the facer may have a thickness less than or equal to 1 inch, e.g., 0.05 inches to 0.5 inches, such as 0.05 inches to 0.25 inches.

The insulation panel as a whole (including the polymer composite and facer) may have a thickness (depth) less than or equal to 10 inches. For example, the thickness of the insulation panel may be 1 inch to 10 inches, 1 inch to 8 inches, 1 inch to 5 inches, 1 inch to 3 inches. In a non-limiting example, the composite material is 4 feet in width, 8 feet in length, and 1 inch in thickness. In another non-limiting example, the composite material is 3 feet in width, 5 feet in length, and 1 inch in thickness.

Materials as discussed herein having dimensions of, for example, 2 feet in width, 9 feet in length, and 2 inches in thickness may weigh less than or equal to 60 pounds These sizes are exemplary only. The insulation panels discussed herein may be configured to have a relatively larger size, while still being lightweight and highly insulating as compared to other building products, e.g., cementitious products. Low density materials, such as a low density foam composite, allows for the manufacture of materials that are larger than other building materials, e.g., cementitious products, without a corresponding increase in weight. For example, cementitious panels may be more difficult to move and install as compared to insulation panels described herein that have similar or the same dimensions.

While principles of the present disclosure are described herein with reference to illustrative aspects for particular applications, the disclosure is not limited thereto. Those having ordinary skill in the art and access to the teachings provided herein will recognize additional modifications, applications, aspects, and substitution of equivalents that all fall in the scope of the aspects described herein. Accordingly, the present disclosure is not to be considered as limited by the foregoing description.

EXAMPLES

The following example is intended to illustrate the present disclosure without being limiting in nature. It is understood that the present disclosure encompasses additional embodiments consistent with the foregoing description and following example.

Example 1

The following polymer composite was prepared in accordance with the present disclosure. Table 1 lists the composition of the polymer composite and the facer.

TABLE 1

|  | Composite (% wt.) | Facer (% wt.) |
| --- | --- | --- |
| Polyol | 20.1 | 8.4 |
| Isocyanate | 29 | 9.2 |
| Filler | 50 | 82.3 |
| Blowing agent | 0.5 | — |
| Surfactant | 0.4 | — |

Briefly, the polymer composite was prepared by combining the polyol, surfactant, isocyanate, blowing agent (e.g., water), and filler (e.g., fly ash) to form a mixture. The mixture was placed into a mold and allowed to free rise into a closed-cell polymer composite foam. The polymer composite was then at least partially covered with a polymer composite facer, producing an insulation panel that provides a dense structure exhibiting sufficient thermal insulation. The facer was prepared by combining the polyol, isocyanate and filler. The facer was then rendered to provide final aesthetics.

It is intended that the specification be considered as exemplary only, with a true scope and spirit of the present disclosure being indicated by the following claims.

What is claimed is:

1. An insulation panel comprising:
    a polymer composite comprising a first polymer and a first filler, wherein the first filler is present in an amount of 40% to 80% by weight, based on a total weight of polymer composite, wherein the polymer composite has a closed cell structure, and wherein the polymer composite has a density of 2 pcf to 30 pcf; and
    a facer covering at least a portion of the polymer composite, the facer comprising a second polymer and a second filler;
    wherein the polymer composite has a closed cell content greater than or equal to 60% as measured by ASTM D6226-15; and
    wherein a compressive strength of the insulation panel is 100 psi to 350 psi.
2. The insulation panel of claim 1, wherein the insulation panel has an insulation R-value per inch of at least 2.5.
3. The insulation panel of claim 1, wherein the insulation panel has an insulation R-value per inch of at least 4.
4. The insulation panel of claim 1, wherein the second filler is present in an amount of greater than or equal to 50% by weight, with respect to the total weight of the facer.
5. The insulation panel of claim 1, wherein the facer has a density greater than the density of the polymer composite.
6. The insulation panel of claim 5, wherein the density of the facer is 50 pcf to 200 pcf.
7. The insulation panel of claim 1, wherein the insulation panel has a thickness less than or equal to 3 inches.
8. The insulation panel of claim 1, wherein the facer has a thickness less than or equal to 1 inch.
9. The insulation panel of claim 1, wherein the first filler, the second filler, or both, comprises fly ash, limestone, clay, gypsum, glass powder, bottom ash, glass microspheres, cenospheres, calcium carbonate, or a combination thereof.
10. The insulation panel of claim 1, wherein the first polymer, the second polymer, or both comprises polyurethane.
11. The insulation panel of claim 1, wherein an outer surface of the insulation panel includes attachment features complementary to an adjacent insulation panel, the attachment features comprising a tongue, a groove, a fastener, a bracket, or a rail.
12. An insulation panel comprising:
    a polymer composite comprising a polymer and a filler, the polymer composite having a closed cell content greater than or equal to 50% as measured by ASTM D6226-15 and a density of 5 pcf to 15 pcf; and
    a facer covering at least a portion of the polymer composite, the facer having a density of 100 pcf to 200 pcf;
    wherein the insulation panel has an insulation R-value per inch of at least 2.5; and
    wherein an outer surface of the insulation panel includes attachment features complementary to attachment features of an adjacent insulation panel.
13. The insulation panel of claim 12, wherein the attachment features include a tongue, a groove, a fastener, a bracket, or a rail.
14. The insulation panel of claim 12, wherein the polymer is a first polymer and the filler is a first filler, and wherein the facer comprises a second polymer and a second filler, the first polymer being the same or different than the second polymer, and the first filler being the same or different than the second filler.
15. The insulation panel of claim 14, wherein the first filler, the second filler, or both, comprises fly ash, limestone, clay, gypsum, glass powder, bottom ash, glass microspheres, cenospheres, calcium carbonate, or a combination thereof.
16. The insulation panel of claim 12, wherein the insulation panel has a thickness of 1 inch to 3 inches.
17. An insulation panel comprising:
    a polymer composite comprising a first polymer and a first filler, wherein the first filler is present in an amount of 40% to 80% by weight, based on a total weight of polymer composite; and wherein the polymer composite has a closed cell structure; and a facer covering at least a portion of the polymer composite, the facer having a density greater than a density of the polymer composite;

wherein the insulation panel has a thickness less than or equal to 3 inches;

wherein the insulation panel has an insulation R-value per inch of at least 4; and wherein a compressive strength of the insulation panel is 100 psi to 350 psi.

18. The insulation panel of claim 17, wherein the polymer composite has a closed cell content of 50% to 80% as measured by ASTM D6226-15.

19. The insulation panel of claim 17, wherein an outer surface of the insulation panel includes a tongue, a groove, a fastener, a bracket, or a rail.

* * * * *